United States Patent Office

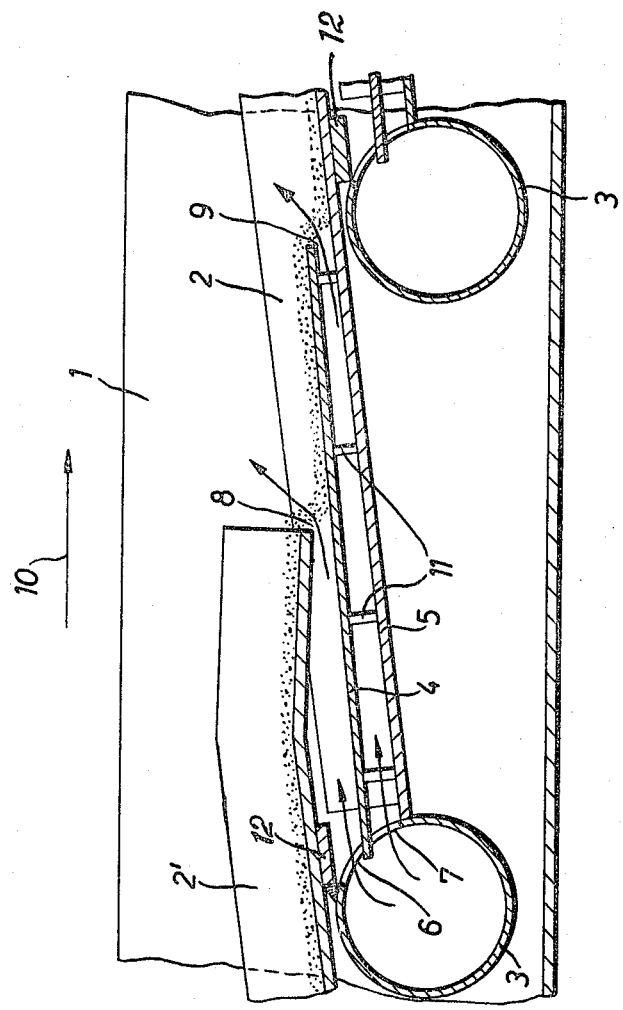

3,545,098
Patented Dec. 8, 1970

3,545,098
OSCILLATING CONVEYOR
Gunter Eichholz, Cologne-Mulheim, and Horst Kerzel, Cologne-Bayenthal, Germany, assignors to Klockner-Humboldt - Deutz Aktiengesellschaft, Cologne-Deutz, Germany, a corporation of Germany
Filed Feb. 27, 1969, Ser. No. 802,959
Claims priority, application Germany, Mar. 15, 1968, 1,556,745
Int. Cl. B65g 27/16
U.S. Cl. 34—164            2 Claims

ABSTRACT OF THE DISCLOSURE

An oscillating conveyor for granular material comprising a plurality of individual trough sections, the adjacent ends of which are arranged in a vertically spaced overlapping relation. Each trough section has over a part of its length a hollow bottom forming a passage through which a gaseous heating or cooling medium is forced from a supply pipe through the material deposited in the trough for conveyance. Above this hollow bottom a second passage is formed between the lower side of the discharge end of the preceding trough section and the upper side of the hollow bottom. This second passage is also connected with the supply pipe and discharges gaseous heating and cooling medium into the trough at a point ahead of the point where the first passage terminates in the trough.

---

The invention relates to an oscillating conveyor, particularly to an improvement in an oscillating conveyor for conveying of granular or crumbly materials, particularly an electrode substance. The conveyor comprises a conveyor trough consisting of a plurality of substantially horizontally disposed trough sections which are vertically offset so as to form a gap between each two adjacent ends which are disposed in scale-like overlapping relation, whereby each gap is in communication with a feed pipe for a gaseous cooling or heating medium. The present invention is an improvement of the inventor's oscillating conveyor disclosed in their copending patent application Ser. No. 768,123, filed Oct. 16, 1968, now Patent No. 3,512,267.

In such an oscillating conveyor it is advantageous for some applications when at the locations where two adjacent ends of the trough section overlap and at which the cooling or heating medium is supplied that these overlapping locations either at their entire length or only along a certain range of the conveyor follow closely one after the other. This would require a great number of feed pipes for the gaseous medium, which all would have to be provided with control members and this, considering the purchase costs and maintenance would require a considerable investment. In accordance with the present invention the oscillating conveyor is improved in such a manner that the bottom of one or more sections of conveyor trough is made hollow, and that the hollow space at one end terminates in the discharge aperture of the feed pipe for the gaseous medium and in the conveying direction of the material terminates in the conveyor trough. The upper wall of the hollow bottom is shorter than the lower wall of the same and the discharge aperture in the feed pipe is subdivided into two apertures arranged one above the other.

The advantage of constructing the individual or all of the trough sections of such an oscillating conveyor as suggested in accordance with the present invention resides in this, that the number of the feed pipes is reduced even tough the number of the discharge apertures for the gaseous medium is increased. Furthermore, it is possible to increase in an already existing oscillating conveyor in a simple manner by the addition of a suitable dimensioned piece of sheet metal, which is spaced from the bottom of one or more of the trough sections, the cooling and heating capacity of such an oscillating conveyor without great expense and without changing the feed pipes and the control members.

It is also an object of the invention to provide between the upper wall and the lower wall of the hollow bottom a plurality of fixedly mounted distance pieces. This arrangement of the distance members increases substantially the rigidity of the hollow double-walled bottom of the trough sections.

Referring now to the single figure of the drawing, which illustrates one embodiment of a portion of a oscillating conveyor of the present invention in a longitudinal vertical section, the conveyor trough 1 is formed by a plurality of substantially horizontal sections 2, 2', the adjacent ends of which are arranged in overlapping and vertically spaced relation. At each location where the adjacent trough section overlap each other, is formed a gap which is in communication with a feed pipe 3 for a gaseous cooling or heating medium. In accordance with the invention the bottom of each one of the trough sections 2, 2' is hollow and is formed of two vertically spaced walls. The upper wall 4 is shorter than the lower wall 5. In the direction of the material supply the upper wall 4 extends with its left hand end into the discharge aperture of the feed pipe 3. This has the result that the discharge aperture is subdivided into two apertures 6 and 7 of which the upper aperture 6 is connected with a passage communicating with a gap 8. This passage is formed between the lower side of the bottom of the preceding trough section 2' and the upper side of the bottom of the next following trough section 2. The aperture 7, however, communicates with the hollow space between the upper wall 4 and the lower wall 5 of the hollow bottom of trough section 2 and terminates in the trough section 2 at the right hand end of the upper wall 4 where a gap 9 is formed.

Accordingly, the gaseous medium is discharged from the supply pipe 3 through two apertures 6 and 7 and one portion of the gaseous medium passes through the gap 8, while another portion of the gaseous medium passes through the gap 9 which is horizontally spaced from the gap 8 in the direction of the arrow 10. The gaps 8 and 9 discharge the gaseous medium into the trough and into the material conveyed by the oscillating conveyor. For the purpose of increasing the rigidity of the hollow bottom there are arranged fixedly mounted distance pieces 11 between the walls 4 and 5.

Preferably, each trough section 2 and 2' is caused to rest, at a point a short distance from its material discharge end with its lower face on a cross bar 12 which is secured by welding or the like to the upper portion of the feed pipe 3 directly above the upper discharge aperture 6 so as to direct the gaseous medium into the upper passage leading to the cap 8.

What we claim is:
1. In an oscillating conveyor for conveying granular and crumbly material, particularly electrode substances, a substantially horizontally extending conveyor trough comprising a plurality of individual trough sections arranged with their adjacent ends in vertically spaced scale-like overlapping relation so as to form a gap between each two adjacent sections, and a supply pipe for selectively supplying a gaseous cooling and heating medium respectively, said supply pipe being provided with a discharge aperture which is in communication with said gap, the improvement comprising that the bottom of at least one of said trough sections is hollow over a portion of its length and is formed by two vertically spaced walls of which the upper one at one end extends into said discharge aperture of said supply pipe and divides said discharge aperture into two vertically spaced apertures, the upper wall of said hollow bottom being shorter than the lower one, thereby forming a substantially horizontal passage between the lower side of the discharge end of the preceding trough section and the upper side of the upper wall of said hollow bottom, one end of said passage being in communication with the upper one of said two apertures, while the lower one of said two apertures is in communication with one end of the hollow space in said hollow bottom, the other end of which terminates in a gap which is horizontally spaced from the discharge end of said passage disposed above said hollow bottom of said trough section.

2. An oscillating conveyor according to claim 1, including a plurality of fixedly mounted distance pieces in the hollow space formed between said upper and the lower wall of said hollow bottom.

References Cited
UNITED STATES PATENTS

| | | | |
|---|---|---|---|
| 2,743,006 | 4/1956 | Nielsen | 34—164UX |
| 3,173,768 | 3/1965 | Witte | 198—220(BIO) |
| 3,195,713 | 7/1965 | Morris et al. | 198—220(BIO) |
| 3,216,344 | 11/1965 | Beagle | 34—164XV |

EVON C. BLUNK, Primary Examiner

R. S. GAITHER, Assistant Examiner

U.S. Cl. X.R.

198—220; 302—56